US012739314B2

(12) United States Patent
Kovalchukov et al.

(10) Patent No.: US 12,739,314 B2
(45) Date of Patent: Sep. 15, 2026

(54) INTEREST PACKET ORCHESTRATION IN INFORMATION CENTRIC NETWORKING

(71) Applicant: Intel Products IP LLC, Santa Clara, CA (US)

(72) Inventors: Roman Kovalchukov, Tampere (FI); Nageen Himayat, Fremont, CA (US); Srikathyayani Srikanteswara, Portland, OR (US); Yevgeni Koucheryavy, Tampere (FI); Marcin Spoczynski, Leixlip (IE); Yi Zhang, Portland, OR (US); Dmitri Moltchanov, Tampere (FI); Gabriel Arrobo, Hillsboro, OR (US); Hao Feng, Hillsboro, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/216,807

(22) Filed: Jun. 30, 2023

(65) Prior Publication Data

US 2023/0362279 A1 Nov. 9, 2023

Related U.S. Application Data

(60) Provisional application No. 63/431,543, filed on Dec. 9, 2022.

(51) Int. Cl.
*H04L 67/63* (2022.01)

(52) U.S. Cl.
CPC .................................... *H04L 67/63* (2022.05)

(58) Field of Classification Search
CPC ....................................................... H04L 67/63
See application file for complete search history.

(56) References Cited

U.S. PATENT DOCUMENTS

2014/0365550 A1* 12/2014 Jang ......................... H04L 67/63 709/201
2016/0380986 A1* 12/2016 Millar ................... H04L 63/061 709/206

(Continued)

FOREIGN PATENT DOCUMENTS

WO WO-2020223640 A1 * 11/2020 ............. H04L 69/22

OTHER PUBLICATIONS

Pirmagomedov, Rustam, “Augmented Computing at the Edge Using Named Data Networking”, In 2020 IEEE Globecom Workshops, 2020, 6 pgs.

(Continued)

*Primary Examiner* — Chae S Lee
(74) *Attorney, Agent, or Firm* — Schwegman Lundberg & Woessner, P.A.

(57) ABSTRACT

System and techniques for orchestrating a service with an interest packet in information centric networking are described herein. The interest packet includes a compound name that includes multiple ICN name components, and the interest packet includes a field with a list of ICN components. A device, after receiving the interest packet, locates an ICN name component from the multiple ICN name components that is represented in the list of ICN components. The device may then select an interface from multiple interfaces available to the device, the selection based on the ICN name component. The device may then transmit the interest packet via the interface.

20 Claims, 10 Drawing Sheets

(56) References Cited

U.S. PATENT DOCUMENTS

| | | | | |
|---|---|---|---|---|
| 2017/0359254 | A1* | 12/2017 | Oran | H04L 45/38 |
| 2020/0136981 | A1* | 4/2020 | Byun | H04L 47/2475 |

OTHER PUBLICATIONS

Sifalakis, Manolis, "An information centric network for computing the distribution of computations", in Proc. of the 1st International Conference on Information-centric Networking, [Online]. Retrieved from the Internet URL https doi.org 10.1145 2660129.2660150, 2014, 10 pgs.

Zhang, Haitao, "Sharing mhealth data via named data networking", in Proceedings of the 2016 conference on 3rd ACM Conference onInformation-Centric Networking, [Online]. Retrieved from the Internet URL https doi.org 10.1145 2984356.2984379, 2016, 6 pgs.

* cited by examiner

FIRST LEVEL DELIMITER: /

SECOND LEVEL DELIMITER: _

INTEREST PACKET ORCHESTRATION IN INFORMATION CENTRIC NETWORKING

CLAIM OF PRIORITY

This patent application claims the benefit of priority, under 35 U.S.C. § 119, to U.S. Provisional Application Ser. No. 63/431,543, titled "IN-NETWORK DYNAMIC AND DISTRIBUTED COMPUTE ORCHESTRATION: NETWORK-MAKES-DECISION" and filed on Dec. 9, 2022, the entirety of which is hereby incorporated by reference herein.

BACKGROUND

Information centric networking (ICN) (e.g., named data networking (NDN)) is a transport layer or internet layer protocol that is an alternative to address-based approaches, such as the Internet Protocol (IP). ICN replaces host addresses with named data (or functions in a named function networking (NFN)). ICN nodes generally include two data structures, a pending interest table (PIT) and a forwarding information base (FIB) that are used for routing.

When data is desired, a requestor releases an interest packet naming the data being sought. A receiving ICN node records the interest packet arrival along with the physical interface upon which the interest was received in a PIT entry. The ICN node uses the FIB to determine upon which physical interface to forward the interest. When a node has data that matches the name of the interest packet, such a node generally responds to the interest packet in a data packet (e.g., ICN data packet). When the data packet arrives at an interim node, that node matches the name of the data packet with a PIT entry and uses the physical interface of the PIT entry to forward the data; the PIT entry being removed once the data packet is sent.

Because only the name of the data is necessary, data may be cached throughout the network without orchestration present in host-based techniques. Thus, as a data packet traverses an interim ICN node, that node may cache the data packet to respond to future requests for the same data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
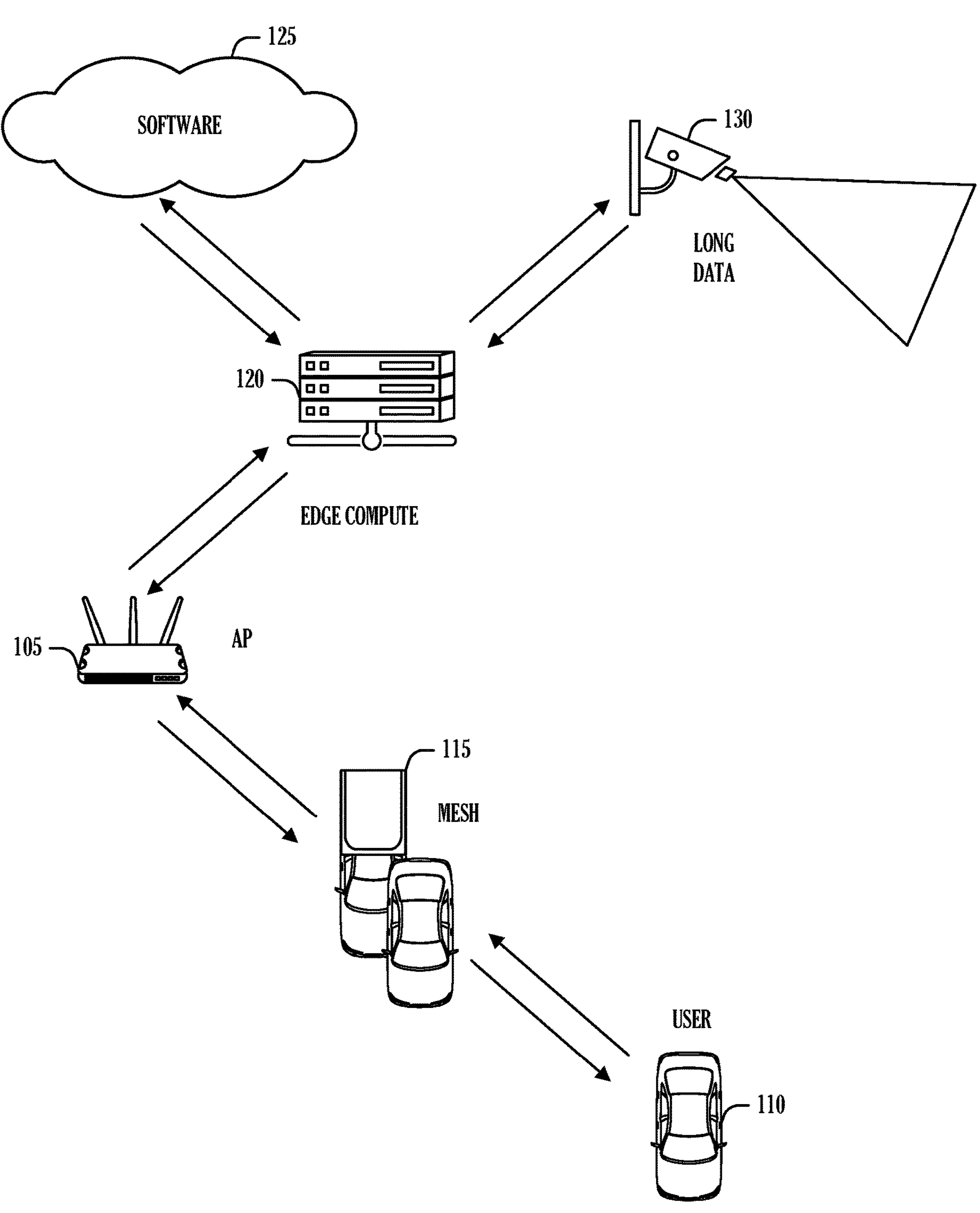
FIG. 1 illustrates an example of an environment and a system for interest packet orchestration in ICN, according to an embodiment.

Networks often have fixed or relatively fixed relationships between network nodes and network lines of communications, be those wired or wireless. Dynamic environments, typically supported by radio links to connect network nodes, pose a number of challenges. When attempting to orchestrate compute, software, or data resources into a network-node spanning workload, the variable nature of dynamic networks may present additional challenges. Often, an orchestrator is used to track available resources, both the existence and location of those resources, and either assemble workloads or enable a requestor to assemble workloads.

Although ICN provides several advantages over IP based networks, ICN orchestration often involves either a presumption of a requested service or an additional translation layer on compute nodes to map, for example, a requested user function name to the set of available compute devices. Both approaches tend to be centralized and do not take advantage of network-wide service knowledge typically available in ICNs. Efficient usage of previously computed, or partially computed, results in the ICN are often lost because of the central orchestration running at a layer above the network. Orchestration mechanisms may be divided into a couple of groups, here labeled "source makes decision" and "delegated node makes decision." The source makes decision technique assumes that the source is the device that not only initiates the service but is also involved in the choice of the components of the service, such as the compute, the software, and the data used for service composition. In the delegated node makes decision technique, these decisions are delegated (e.g., outsourced) to a network node and the source node is only responsible for initiating the service. The delegation technique may improve service reliability when running over unreliable wireless last mile access links or the like.

A challenge of the "source makes decision" technique involves the tight involvement of the service consumer in the service orchestration, where the compute server, the data, and the software selection are performed at the consumer node. This decreases service reliability, especially when the links to the consumer node are unreliable. Again, the "delegated node makes decision" alleviates these issues but also introduces a third party that must be fully trusted and is responsible for (e.g., capable of) service composition. Accordingly, additional security measures or usage of specialized hardware or software may be needed throughout the network.

To address issues of service orchestration in networks, a name-based orchestration at the network level may be used. Here, the consumer creates a compound ICN name composed of other ICN names (e.g., name components). The name components are arranged in the compound name to describe the service (e.g., compute, software, data, etc.). To track progress for service completion, a field in interest packets for the service can be used to track which of the ICN name components have been satisfied. The combination of the service description in the name and the tracking of completed service components enables any aware ICN node to either route the interest towards a next ICN name component or to perform the ICN name component. When the field indicates that the service is complete, a data packet with the results may be returned to the consumer node. In this manner, the consumer node is in control of the orchestration from a definitional perspective, yet the network may leverage network knowledge of components to route and complete the service without a central orchestrator. Simulations have demonstrated that this technique has superior performance in terms of the number of service requests completed in each time frame.

In an example, the interest packet orchestration of a service may leverage previously computed results that may constitute only part of the service request. For example, when a compute request is received, a node may first check whether the result has been previously computed or if part of the result has been previously computed based on the name. Consider sensors on a factory floor where different nodes may perform different computations on the sensor data. There may be overlap in the compute requests, for instance, where one node requests function ONE and function THREE on sensor data FIVE-NINE. Another node may request Function TWO and Function THREE on sensor data ONE-SEVEN. Here function THREE on sensor data FIVE-SEVEN is the overlap where previously computed results may be re-used. Additional details and examples are provided below.

FIG. 1 illustrates an example of an environment and a system for interest packet orchestration in ICN, according to an embodiment. As illustrated, a consumer node 110 is part of a mesh 115 connected to an access point 105. The access point 105 provides connectivity to a network-server 120 that, in turn, facilitates communications to a cloud 125 and a camera 130 (e.g., a sensor). The following techniques may be performed by any of the illustrated devices that are routing packets. However, to simplify some elements, the following examples assume that the consumer node 110 is originating an interest packet for a service that is routed through the access point 105. To this end, the access point 105 includes multiple interfaces upon which to route ICN packets, storage for ICN cache as well as PIT and FIB data structures, and possibly instructions used to configure processing circuitry of the access point 105. Accordingly, the processing circuitry may be hardwired, configured by software during runtime, a hybrid (e.g., configured by fuses or switches akin to field programmable gate array (FPGA) configuration), or a combination of all three.

To implement interest packet orchestration, the processing circuitry is configured to receive an interest packet (e.g., from the consumer node 110). The interest packet includes a compound name and a field that includes a list of ICN components. In an example, to maintain compatibility with other ICN systems, the field is the ForwardingHint field, repurposed to hold the list of ICN components. These elements illustrate why this is called "interest packet orchestration," because the organization definition of the service orchestration is contained with the compound name and the field. The compound name includes multiple ICN name components.

Figure 2:
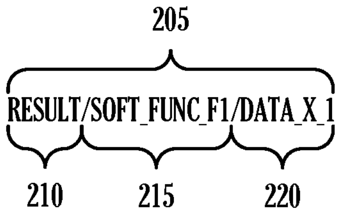
FIG. 2 illustrates an example of a compound name, according to an embodiment.
Figure 2:
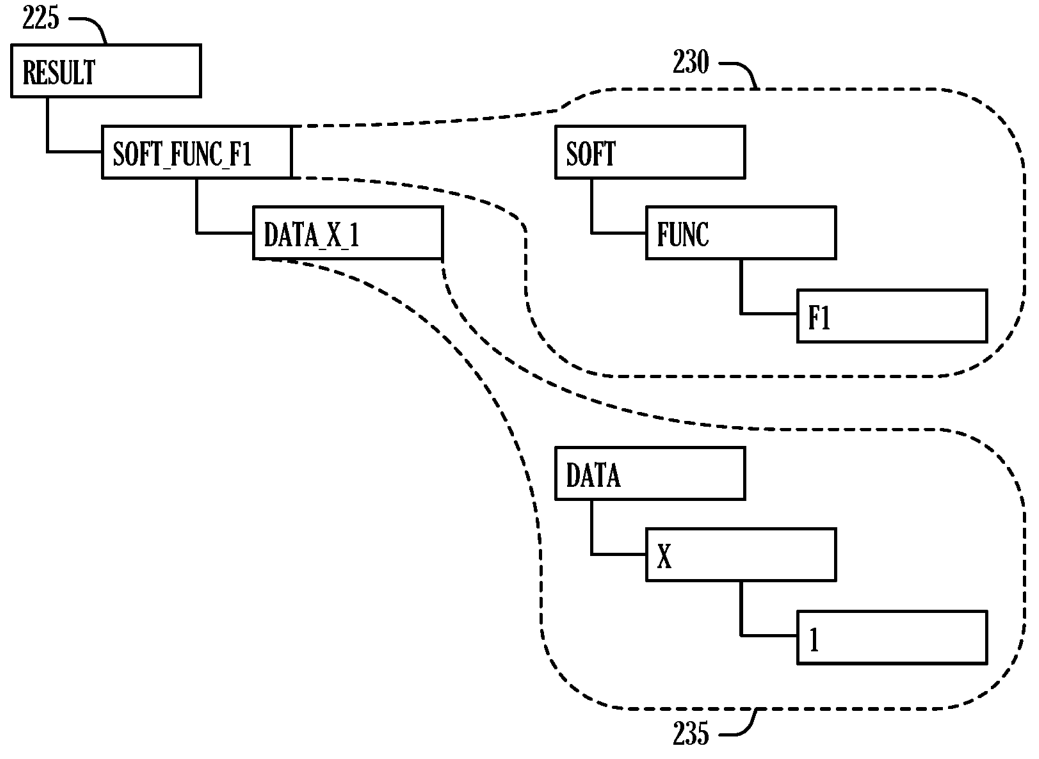

In an example, an ICN name component of the multiple ICN name components correspond to a resource type that is identified in the ICN name component. In an example, the resource type is DATA, SOFTWARE, or COMPUTE. In an example, the compound name includes, from the multiple ICN name components, a first ICN name component that is COMPUTE, a second ICN name component that is SOFTWARE, and a third ICN name component that is DATA. FIG. 2 illustrates these examples, where a COMPUTE (e.g., result) is specified using SOFTWARE (e.g., func_F1) and DATA (e.g., X_1). These are typical aspects to a service definition.

While COMPUTE resource may entail the type of computation, such as a result from a function, a transformation, an encoding, etc., COMPUTE resources may also designate the type of hardware. Examples of hardware types may include an artificial intelligence accelerator-whether designed similarly to a graphic processing unit (GPU) to perform weight transformations or a neuromorphic processor-a cryptographic engine, an infrastructure processing unit (e.g., an IPU, smart network interface card (smartNIC), edge optimized processing unit (EPU), or data processing unit (DPU)), among others. In an example, the processing circuitry of the access point 105 is part of an IPU serving as one of the interfaces of the access point 105. In an example, the COMPUTE resource designation in an ICN name component may include parameters, such as processing power (e.g., operations per second), power use, or latency for a given workload.

The SOFTWARE (e.g., SOFT) resource may include a function, transformation, encoding, or other set of instructions. In an example, the SOFTWARE resource may include aspects of running the instructions, such as a virtual machine or particular language (e.g., C, C++, P4, network programming language (NPL), etc.). When using multiple embedded compound names as described below, SOFTWARE designations may be used to define an entire environment, from operating system, to runtime, to language, to function.

The DATA resources may include data from a sensor, such as the camera 130, a microphone, LIDAR, RADAR, an ultrasonic sensor, a pressure sensor, a gas sensor, etc. The DATA resource may also include images, video, documents, or other items typically considered data. The DATA resource may include the results of previous computations, reducing the need to perform those computations again. In an example, the previous computation data may include a value to indicate when the data is stale or should be re-run before use.

ICN names are hierarchical and use a delimiter between elements of the hierarchy. Although other schemes may be used, the following examples illustrate how ICN names may be embedded within each other to create the compound name based on using delimiters. If other techniques are used, a similar sub-coding would be used. Thus, in an example, each of the ICN name components use a second level delimiter that is different than a first level delimiter of an ICN network to which the ICN router is configured to operate within. In an example, the ICN router uses a naming convention that is hierarchical and uses the first level delimiter to create a first name format. In an example, the ICN name component uses the second level delimiter to create a second name format. The second name format conforms to the first name format except for the second level delimiter. In an example, the first level delimiter is a slash '/' and the second level delimiter is a hyphen '-', a pipe 'I', an asterisk '*', or an underscore '_'. In an example, the multiple ICN name components include a re-coded compound name. Here, the re-coded compound name replaces the first delimiter with a third delimiter in which the third delimiter is different than both the first delimiter and the second delimiter. FIG. 2 illustrates the hierarchical nature of both the compound name 205 (e.g., in tree 225) as well as the sub-components (e.g., the hierarchy tree 230 of the SOFTWARE ICN component delimited by the second level delimiter underscore '_').

The processing circuitry is configured to location an ICN name component from the multiple ICN name components in the compound name that is also represented in the list of ICN components. Here, the processing circuitry is seeking the next element to complete in the service. Because the compound name should not change to enable the caching and routing efficiencies of ICN networks, the list of ICN components in the field indicate which components are left. The examples below assume that an ICN component is removed from the list when it is completed, but the opposite arrangement—in which an ICN component is added to the list—may be used in other examples.

Because the compound name defines the entire service, and the list follows those components not yet done, comparing both indicates where the already completed components may be found; from the interface upon which the interest packet was received. Accordingly, in an example, the processing circuitry is configured to locating a second ICN name component from the multiple ICN name components that is not represented in the list of ICN components and update the FIB of the access point 105 an entry directing a second interest packet for the second ICN name component through a second interface upon which the interest packet was received. This enables a discovery mechanism without any additional signaling, providing better routing in dynamic environments.

The processing circuitry is configured to select an interface, from multiple interfaces of the access point 105, based on the ICN name component. Because the ICN name components are themselves ICN names with a different delimiter, the interface select operates by determining the hierarchy of the ICN name component and then using the FIB of the access point to determine the outbound interface at which the ICN name component is likely to be found.

The processing circuitry is configured to transmit (e.g., communicate) the interest packet using the selected interface. Thus, the interest packet is forwarded as if the name of the interest packet is the ICN name component rather than the compound name. As the compound name interest packet is forwarded, the different elements of the compound name, the ICN name components, will direct the interest packet to the next element of the service until all of the elements are complete as tracked in the list of ICN components as noted above.

Because ICN network nodes generally cache data, and any network node may have compute or software elements (e.g., resources), the access point 105 may provide an ICN name component itself. Accordingly, in an example, the processing circuitry is configured to locate a second ICN name component from the multiple ICN name components—the second ICN name component matching a resource of the access point 105—and remove an item from the list of ICN components that corresponds to the second ICN name component prior to communicating the interest packet to the selected interface. In an example, the resource is a cache entry of data or a computation result (e.g., previously computed value). In an example, the resource is a computational resource corresponding to hardware of the access point 105. In this example, the computational resource may have a resource type of COMPUTE. In an example, the resource is a software resource corresponding to instructions stored in the access point 105. In this example, the software resource may have a resource type of SOFTWARE. In an example, the resource is a data resource corresponding to data stored (e.g., cached) in the access point 105. In this example, the data resource may have a resource type of DATA.

In practice, as illustrated in FIG. 1, the consumer node 110 may construct the interest packet with three ICN name components, a COMPUTE component indicating that a result is sought, a SOFTWARE component identifying what function should be used to obtain the result, and a DATA component indicating upon which data the function will be run. Because the compound name obeys ICN naming conventions, the interest packet may be passed through nodes that do not understand interest packet orchestration, such as the mesh 115 nodes. The interest packet arrives at the access point 105. The access point 105 determines that there are no missing components from the list of ICN components and uses the FIB of the access point 105 to forward the interest to the network-server 120. The network-server 120 satisfies the COMPUTE element and removes this element from the list of ICN components. The network-server 120 then locates the SOFTWARE elements and uses the local FIB to route the interest packet to the cloud 125 to retrieve the function. The interest packet is also forwarded to the camera 130 to retrieve the data. The network-server 120 may then apply the function to the data and obtain the result. The result is returned to the consumer node 110 in a data packet, following PIT entries through the network-server 120, the access point 105, and the mesh 115.

FIG. 2 illustrates an example of a compound name 205, according to an embodiment. The compound name 205 is an ICN name in which one or more of the hierarchical elements are also qualified ICN names with a different delimiter. The delimiters may be assigned levels, such that the top, or first, level delimiter is understood by all nodes of an ICN network, and lower-level delimiters are understood by nodes capable of participating the in the interest packet orchestration described herein.

As illustrated, the compound name 205 includes three ICN name components, a COMPUTE ICN name component 210, a SOFTWARE ICN name component 215, and a DATA ICN name component. Here, the first level delimiter is a slash '/' and separates the ICN name components as it would separate the components of other ICN names. The second level delimiter is an underscore '_' and separates elements within ICN names components. Greater levels of delimiters may be used to provide more nested ICN name components within ICN name components while still maintain the hierarchies.

For example, the tree 225 illustrates the hierarchy of the compound name. The tree 230 illustrates the hierarchy, as defined by the second level delimiter, of the SOFTWARE ICN name component 215 and the tree 235 does the same for the DATA ICN name component 220. The COMPUTE ICN name component has only a single element. As long as a receiving node is aware of the various levels of delimiters, the string may be parsed to find the nested ICN name components.

Figure 3:
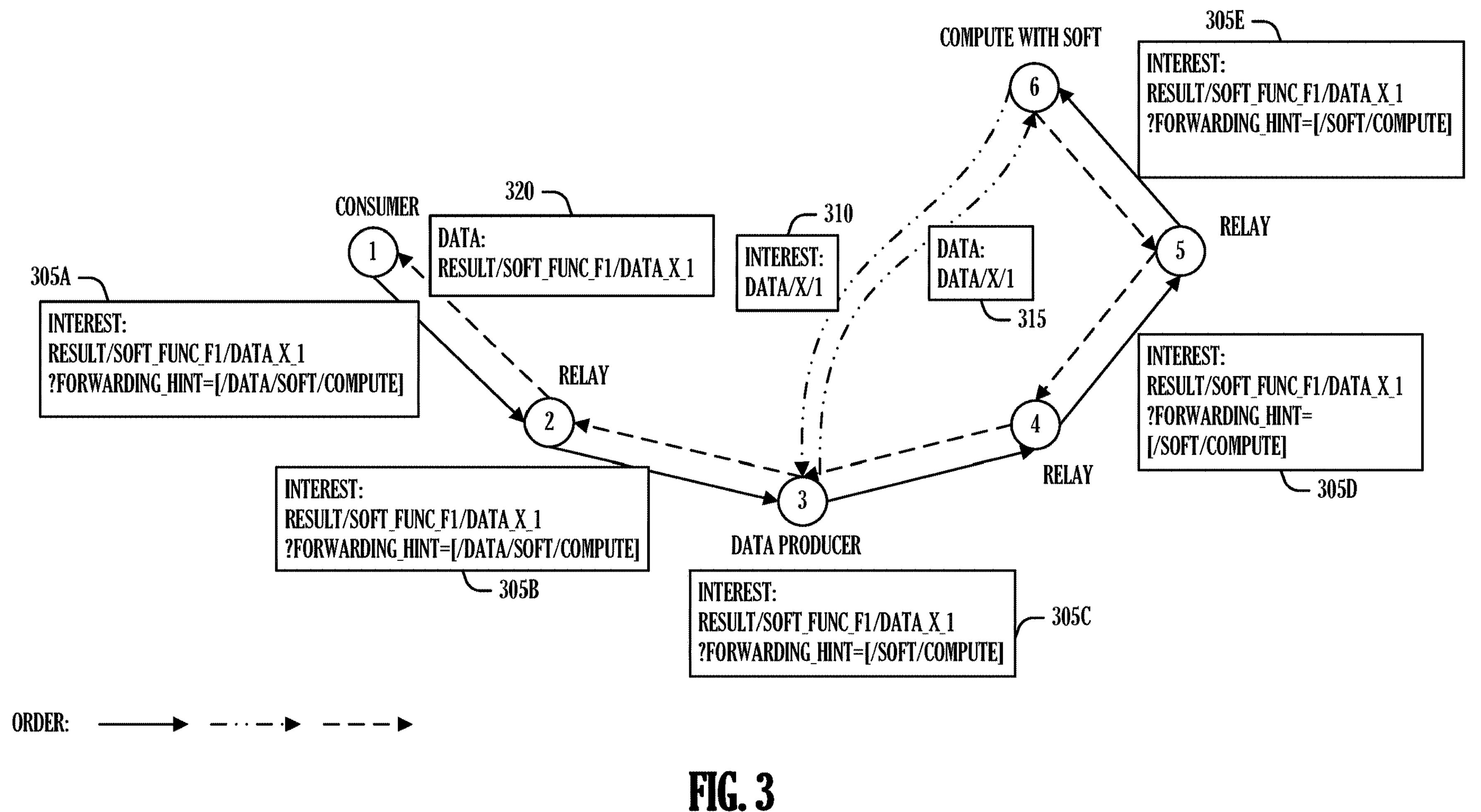
FIG. 3 illustrates an example of packet traversal through a network, according to an embodiment.

FIG. 3 illustrates an example of packet traversal through a network, according to an embodiment. The interest packet 305 undergoes changes to the ForwardingHint field as ICN name components are found. The ForwardingHint field is present in current ICN implementations, such as named data networking (NDN). Accordingly, its use will not involve changing ICN protocols. The requested service for the GenericNameComponent (e.g., result interest name) may be written as follows:

result/
<soft-full-name>/

<data-x-full-name>/
<data-x-full-name>/
. . .
<data-x-full-name> resulting in the overall request (e.g., result interest name) of ndn://result/soft-full-name/data-x-1/data-x-2/ . . . /data-X-3, where "1", "2", and "3" are the data full names. In this example, the first level delimiter is a slash '/' and the second level delimiter is a hyphen '-'.

The "ForwardingHint" field contains the following:

ResultName
?ForwardingHint= [/data1/data2/soft/compute]
?Nonce=Random int
?HopLimit=N As illustrated, the consumer creates the interest packet 305A with the complete compound name and the list of ICN components in the ForwardingHint field. The interest packet 305B is forwarded by the relay. Because the relay does not provide a component, the list of ICN components is the same in the interest packet 305B as it is in the interest packet 305A. However, once the interest packet 305C reaches the data producer, the DATA component is satisfied and removed from the list of ICN components. The interest traverses two more relays unchanged, the interest packet 305D and the interest packet 305E until reaching the COMPUTE with SOFTWARE. The COMPUTE with SOFTWARE produces the interest packet 310 in order to retrieve the data in the data packet 315. With all of the components, the COMPUTE with SOFTWARE node produces the result. The result is sent back to the consumer via data packet 320 using the same name as the interest packet 305.

Figure 4:
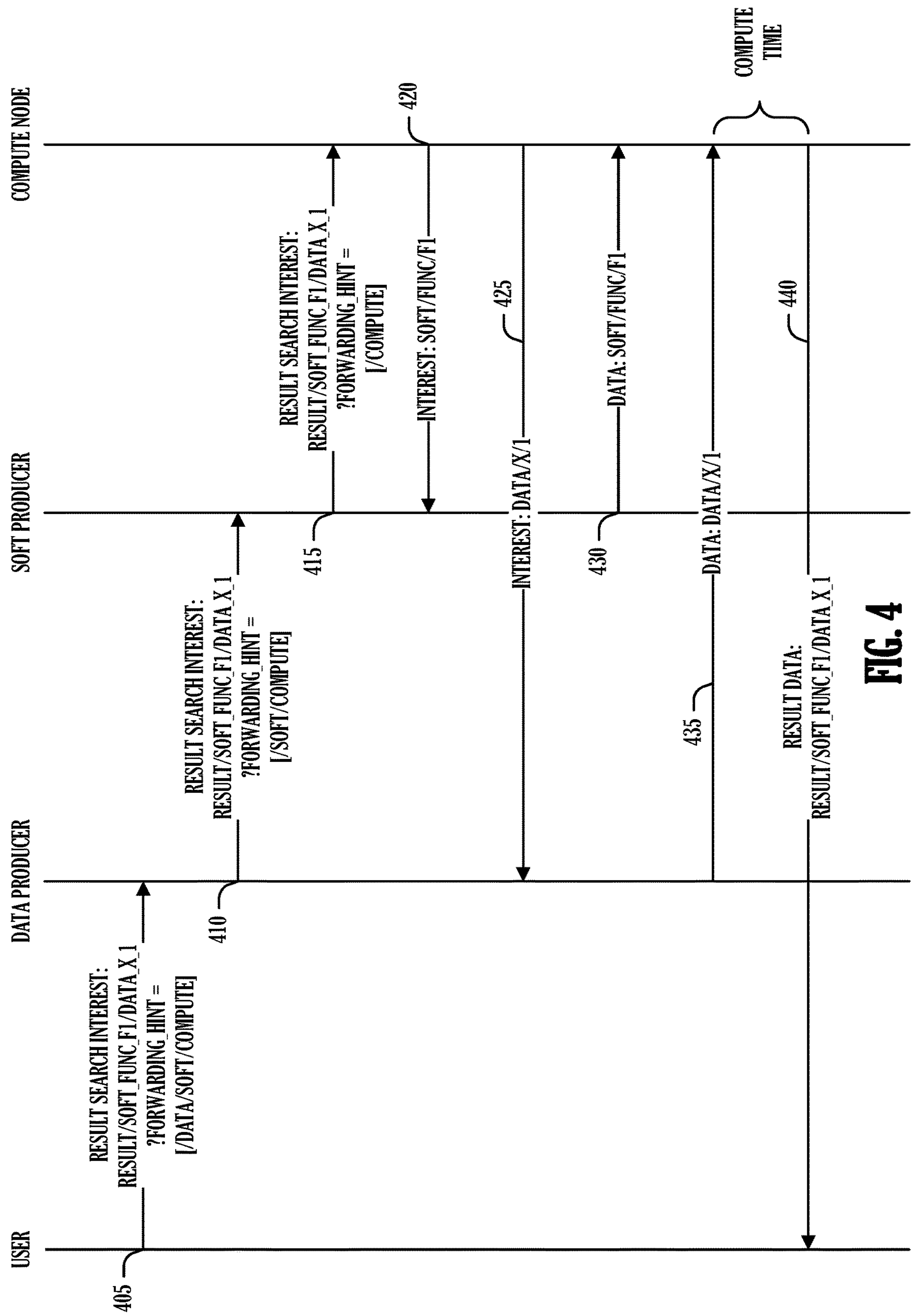
FIG. 4 illustrates an example signaling diagram for interest packet orchestration, according to an embodiment.

FIG. 4 illustrates an example signaling diagram for interest packet orchestration, according to an embodiment. As illustrated, a consumer-generated (e.g., user) request for service "result/soft_func_f1/data_x_1" using the ForwardingHint field with the following value "?ForwardingHint= [/data/soft/compute]," is embodied in an interest packet and transmitted to a data producer. (message 405). Here, underscore '_' acts as the second level delimiter. As noted above, this approach temporarily turns full names of data or software into single ICN name components, enabling decoding which parts of the service request full name represent software or data and how many data components are present.

As the packet traverses the network, it first encounters data, software, or compute producers. A node that satisfies one of these sub-names removes the respective delegation from the ForwardingHint field. For example, if the data producer is encountered first, the content of the ForwardingHint in the Interest packet is modified to "?ForwardingHint= [/soft,/compute]", and the packet is forwarded further. (Message 410). When the software producer is encountered, the content of the ForwardingHint in the Interest packet is modified to, "?ForwardingHint= [/compute]" and the packet is again forwarded. (Message 415).

If a data or a software delegation is missing from the ForwardingHint field, it indicates that the data or the software is available through the interest upon which the interest packet was received. Accordingly, a local FIB may be updated at this and each next node receiving the interest packet. Upon reaching the compute node-after the result search strategy removes the "/compute" delegation from the ForwardingHint field and updates the local FIB at the compute node—the compute node requests software (message 420) and data (message 425) by generating individual interest packets for the requests. If the data or the software were encountered before reaching the compute node, the ForwardingHint field will be missing the data or the software delegation, and default routing should lead towards the interface upon which the interest packet was received by the compute node. When the data or the software delegation is still present in the ForwardingHint field, the compute node may send the interest packet anyway (e.g., message 420 and message 425) or forward the result interest toward data or software, for example, based on the local FIB of the compute node. Upon reception of the data (message 435) and the software (message 430), the compute node performs the computation, and the result is sent back to the consumer (message 440) to satisfy the original result interest packet.

Figure 5:
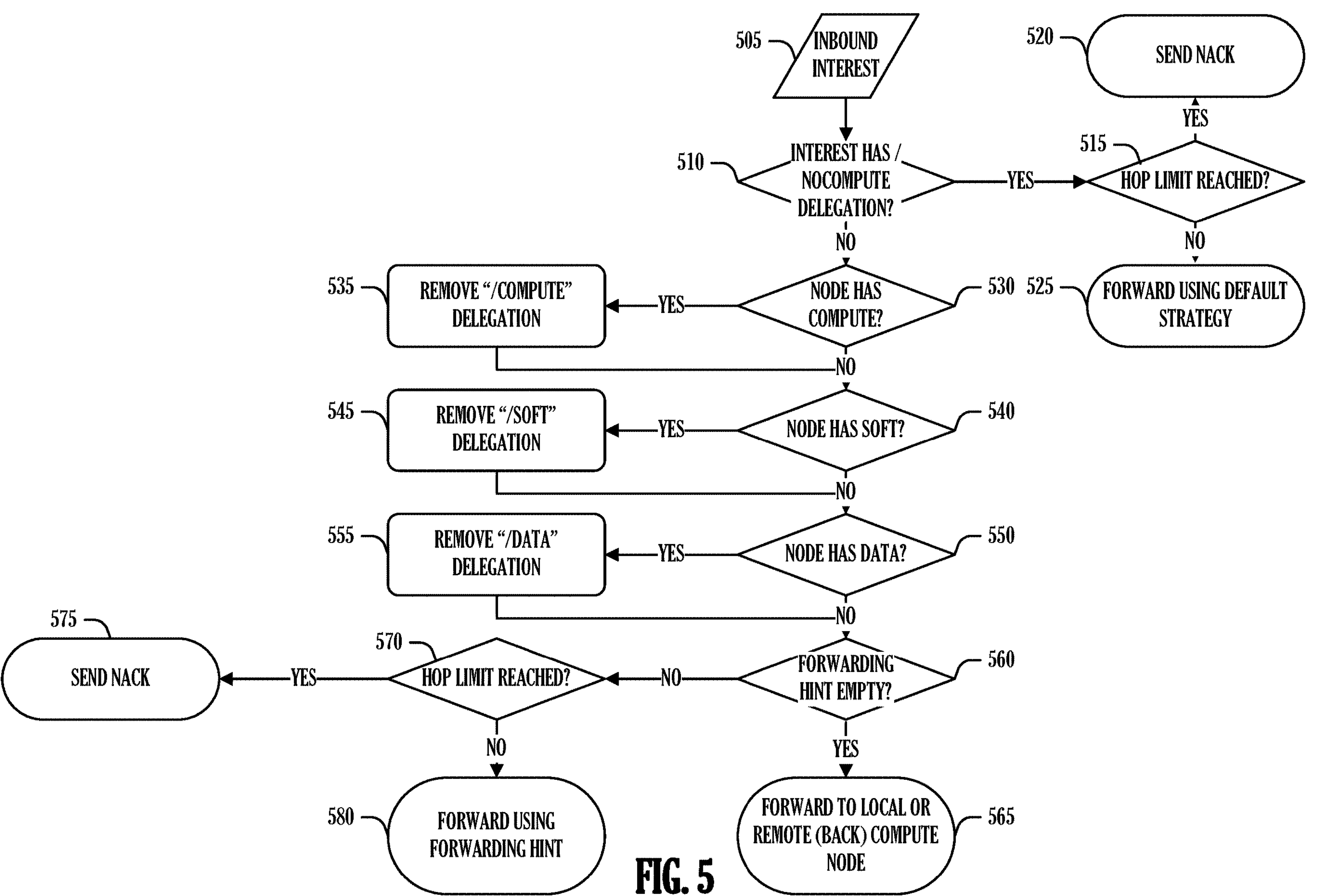
FIG. 5 illustrates an example of handling of an interest packet at an arbitrary node, according to an embodiment.

FIG. 5 illustrates an example of handling of an interest packet at an arbitrary node, according to an embodiment. Here, a "result-search" forwarding strategy is used at network nodes supporting the interest packet orchestration. If the strategy is not installed, a standard forwarding strategy is used to forward interest packets without changes. Here, if the node cannot act as a data, software, or compute node, the interest packet is unchanged and is forwarded using the default forwarding strategy of the ICN network. Otherwise, the illustrated operations are followed.

The interest packet is received (element 505). The interest packet is checked for a NOCOMPUTE delegation (decision 510). If yes, a determination is made as to whether the HOP LIMIT is reached (decision 515). If yes, a no acknowledgment (NACK) is sent (operation 520). Otherwise, the interest packet is forwarded using the default strategy of the network (operation 525.

If there is no NOCOMPUTE delegation (decision 510), a determination is made as to whether this node has compute resources (decision 530). If yes, then the COMPUTE delegation is removed from the list of ICN components (operation 535). Does the node have software resources (decision 540)? If yes, then the SOFTWARE delegation is removed from the list of ICN components (operation 545). Does the node have data resources (decision 550). Again, if yes, then the DATA delegation is removed from the list of ICN components (operation 555).

Once the delegations are addressed, the list of ICN components are checked to see if they are empty (decision 560). If yes, the interest packet is forwarded to the compute node, or the compute is performed locally (operation 565). If no, then the hop limit is checked (decision 570) and either a NACK is sent (operation 575) or the interest packet is forwarded (operation 580). The order in which/data, /software, and/compute producers' names are specified in ForwardingHint acts as a suggested, but not mandatory, order of search for the ICN components. The order may be specified by a user application or may depend on the assumptions of component availability, reachability, scarcity, size, etc. Nodes using the result-search strategy or the default ICN forwarding strategy will generally prioritize outbound interfaces that satisfy routes toward names at the front of the list of ICN components (e.g., in the ForwardingHint).

Figure 6:
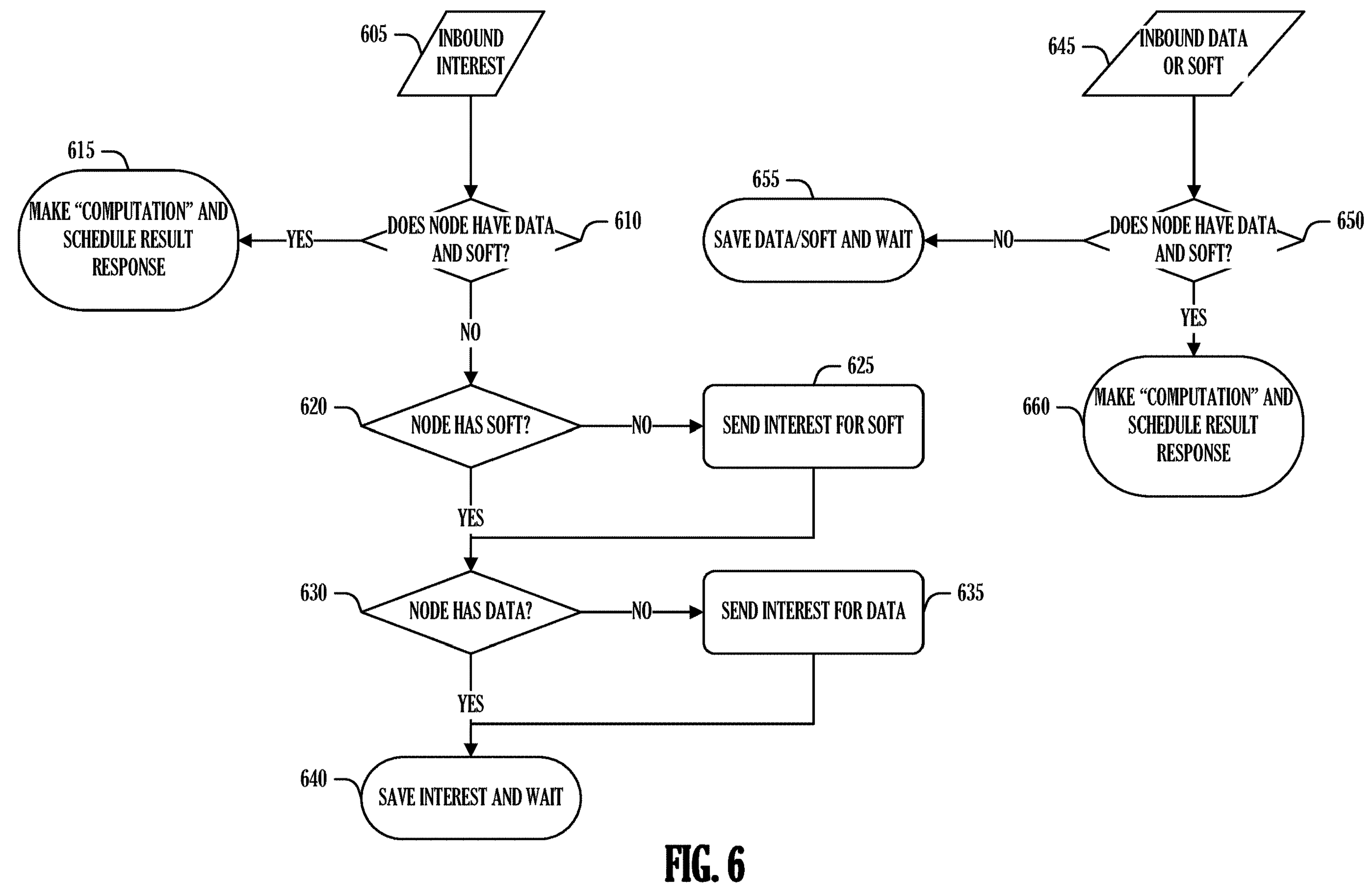
FIG. 6 illustrates an example of handling of an interest packet at a compute node, according to an embodiment.

FIG. 6 illustrates an example of handling of an interest packet at a compute node, according to an embodiment. As the interest packet is received (document 605), a determination is made as to whether the local node has the data and the software resources (decision 610). If yes, the computation is performed and a result is returned (e.g., in a data packet) to the consumer (operation 615). If the compute node is missing the software resources (decision 620), the compute node transmits an interest packet to acquire the software resources (operation 625). If the compute node is missing the data resources (decision 630), the compute node sends an interest packet to acquire these resources (operation 635). The compute node then waits (operation 640).

When a data packet is received in response to the interest packets for software or data (document 645), the compute node determines whether all of the resources are now retrieved (decision 650). If there are outstanding interests, then the compute node saves the software or data received (operation 655). When all of the interest packets have been answered by data packets, and the software and data resources are marshalled at the compute node, the computation is performed and a result is returned in a data packet to the consumer (operation 660).

Figure 7:
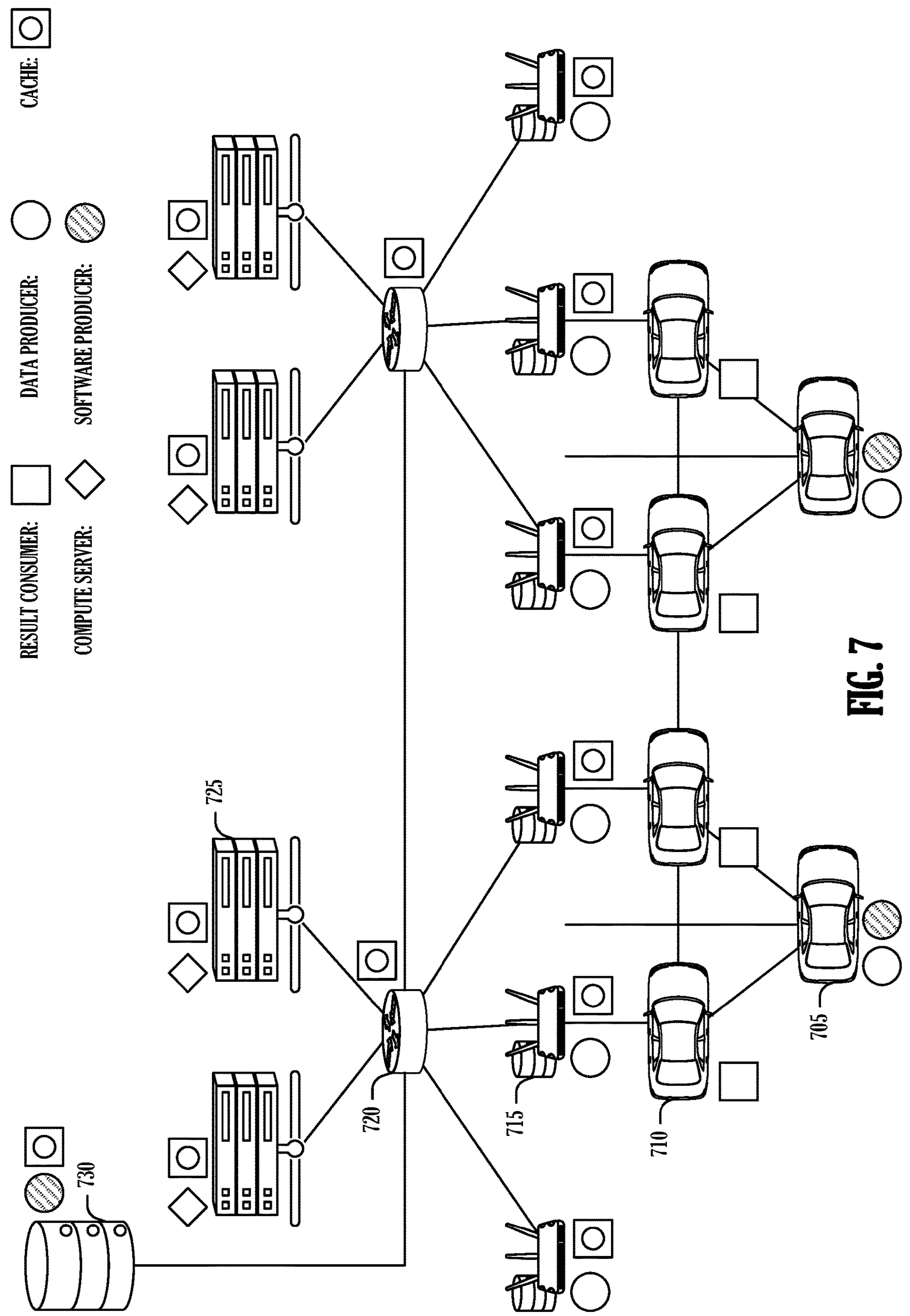
FIG. 7 illustrates an example topology of nodes, according to an embodiment.

FIG. 7 illustrates an example topology of nodes, according to an embodiment. The distribution of nodes includes a data producer 705 connected to a consumer 710. The consumer 710 is connected to an access point 715, which in turn is connected to a network server 725 and cloud storage 730 through a router 720. The illustrated environment is a dynamic use case to which the interest packet orchestration described herein is well suited.

Interest packet orchestration enables partial data or compute usage. That is, data or compute results that have already been computed in the network and are available in nodes caches may be used to satisfy ICN components in a service standard ICN caching functionality. Because the individual components (e.g., data. Software, etc.) have names encoded in the compound (e.g., full result) name, the corresponding data packets are usually cached in the network nodes.

As noted above, there may be more than two levels of delimiters. At the third level, an ICN name component may be another service (e.g., result), enable function chaining. For example:

result/
<soft-full-name>/
<data-1-full-name>/
<data-2-full-name>/
. . .
<data-X-full-name>

<full-name> can be another result name. For example, Where result/soft_func_f1/result_soft__func_f2_data_x_1/data_x_2 represents the compute f1 (f2 (x1), x2) in traditional form, where the function f1 is applied to x2 and the result of the function f2 (x1) takes x1 as an input.

In this case, to enable chaining of compute functions, at compute node(s) for processing, _is replaced with /, _ _ with_, _ _ _ with_ _, etc., where the number of "_" symbols specify the nesting level. In the example above, new Interest packets may be generated by a compute node in the following form:

Soft interest: soft/func/f1
Data interest 1: result/soft_func_f2/data_x_1
  Soft interest: soft/func/f2
  Data interest: data/x/1
Data interest 2: data/x/2

Handling of the "result/soft_func_f2/data_x_1" interest packet is analogous to the technique described above. Here, the compute node for the initial interest packet acts as a consumer of the result.

In an example, interest packet orchestration may be used for non-atomic services, such as streaming data. Here, the use-case may be related to, for example, using a video camera to detect suspicious activities or events. The service may be composed as follows: (i) after the first interest server reserves compute for x seconds; (ii) compute sends interest for x seconds of the video stream; (iii) after computing over y, y<x seconds of the video, the server sends the result to the user; and (iv) every y new second of video needs a new interest, which updates the reservation. Here, the compound name may be represented by the following:

result/soft_N/stream_t=x where x is the absolute of relative timestamp expressed in seconds, N is the software ID.

Figure 8:
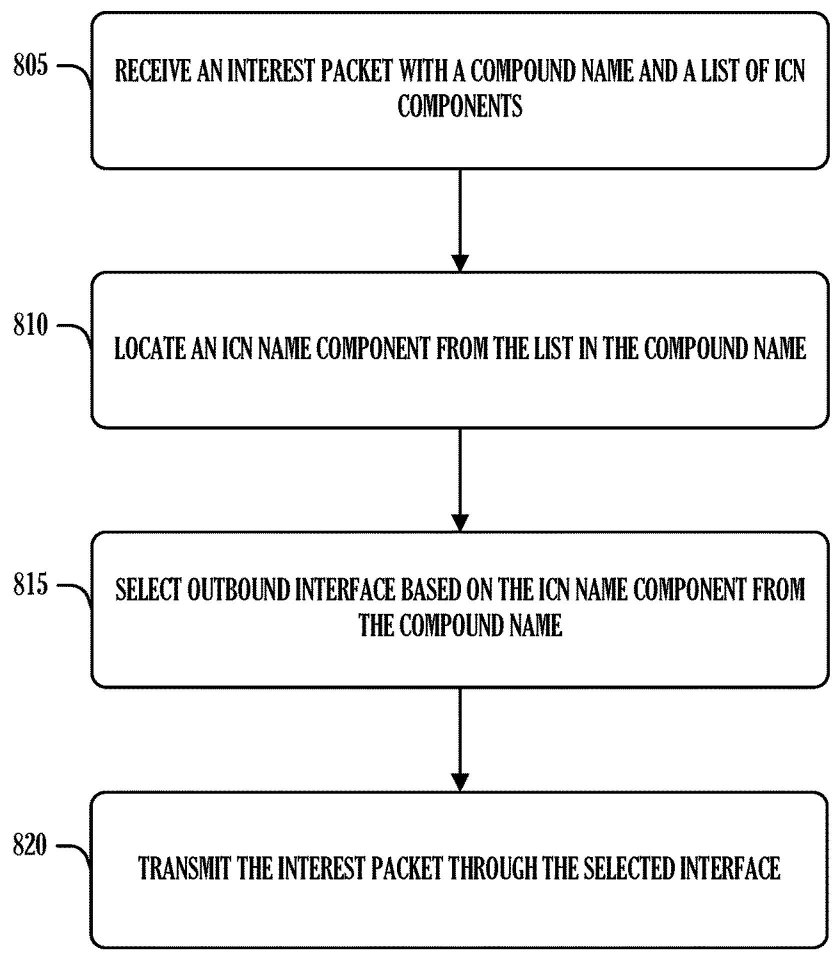
FIG. 8 illustrates a flow diagram of an example of a method for interest packet orchestration in information centric networking, according to an embodiment.

FIG. 8 illustrates a flow diagram of an example of a method 800 for interest packet orchestration in information centric networking, according to an embodiment. The operations of the method 800 are performed by computational hardware, such as that described above or below (e.g., processing circuitry).

At operation 805, an interest packet is received by an ICN router or other device configured to route ICN packets. The interest packet includes a compound name and a field that includes a list of ICN components. The compound name includes multiple ICN name components. In an example, an ICN name component of the multiple ICN name components correspond to a resource type that is identified in the ICN name component. In an example, the resource type is DATA, SOFTWARE, or COMPUTE. In an example, the compound name includes, from the multiple ICN name components, a first ICN name component that is COMPUTE, a second ICN name component that is SOFTWARE, and a third ICN name component that is DATA.

In an example, each of the ICN name components use a second level delimiter that is different than a first level delimiter of an ICN network to which the ICN router is configured to operate within. In an example, the ICN router uses a naming convention that is hierarchical and uses the first level delimiter to create a first name format. In an example, the ICN name component uses the second level delimiter to create a second name format. The second name format conforms to the first name format except for the second level delimiter. In an example, the first level delimiter is a slash '/' and the second level delimiter is a hyphen '-', a pipe '|', an asterisk '*', or an underscore '_'. In an example, the multiple ICN name components include a re-coded compound name. Here, the re-coded compound name replaces the first delimiter with a third delimiter in which the third delimiter is different than both the first delimiter and the second delimiter.

At operation 810, an ICN name component is located from the multiple ICN name components. This ICN name component is also represented in the list of ICN components. In an example, the method 800 includes the operations of locating a second ICN name component from the multiple ICN name components that is not represented in the list of ICN components and updating a forwarding information base (FIB) of the ICN router with an entry directing a second interest packet for the second ICN name component through a second interface upon which the interest packet was received.

At operation 815, an interface of the ICN router is selected from multiple interfaces of the ICN router. The interface selection is based on the ICN name component.

At operation 820, the interest packet is transmitted using the selected interface. In an example, the operations of the method 800 may include locating a second ICN name component from the multiple ICN name components—the second ICN name component matching a resource of the ICN router—and removing an item from the list of ICN components that corresponds to the second ICN name component prior to communicating the interest packet to the interface (operation 820). In an example, the resource is a cache entry of data or a computation result. In an example, the resource is a computational resource corresponding to hardware of the ICN router. In this example, the computational resource may have a resource type of COMPUTE. In an example, the resource is a software resource corresponding to instructions stored in the ICN router. In this example, the software resource may have a resource type of SOFTWARE. In an example, the resource is a data resource corresponding to data stored in the ICN router. In this example, the data resource may have a resource type of DATA.

Figure 9:
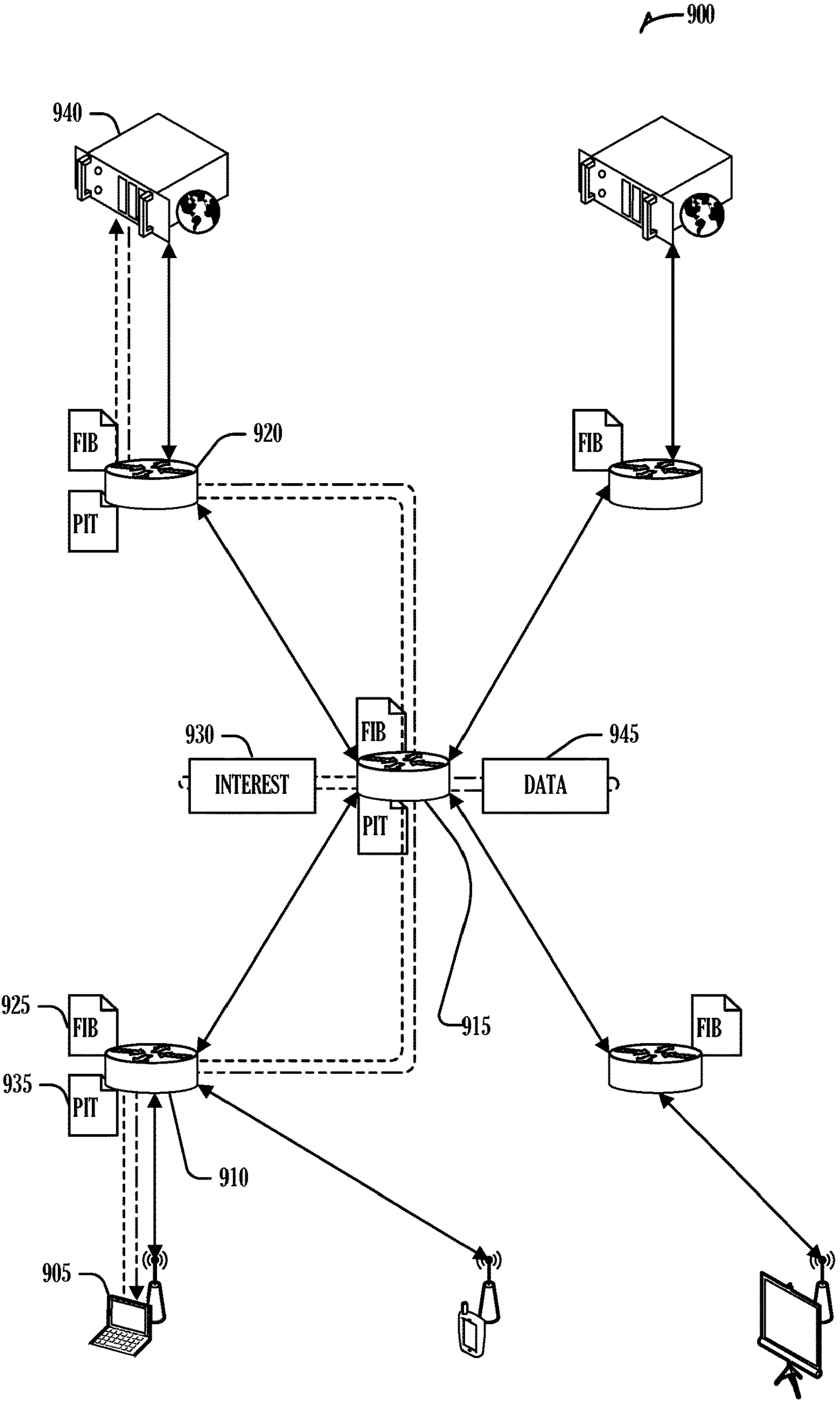
FIG. 9 illustrates an example information centric network (ICN).

FIG. 9 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 905 (e.g., subscriber) requests named content from the network itself. The content request may be called an interest and transmitted via an interest packet 930. As the interest packet traverses network devices (e.g., network elements, routers, switches, hubs, etc.)—such as network elements 910, 915, and 920-*a* record of the interest is kept, for example, in a pending interest table (PIT) at each network element. Thus, network element 910 maintains an entry in its PIT 935 for the interest packet 930, network element 915 maintains the entry in its PIT, and network element 920 maintains the entry in its PIT.

When a device, such as publisher 940, that has content matching the name in the interest packet 930 is encountered, that device 940 may send a data packet 945 in response to the interest packet 930. Typically, the data packet 945 is tracked back through the network to the source (e.g., device 905) by following the traces of the interest packet 930 left in the network element PITs. Thus, the PIT 935 at each network element establishes a trail back to the subscriber 905 for the data packet 945 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest packet 930 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 930 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest packet 930 to data cached in the ICN element. Thus, for example, if the data packet 945 named in the interest packet 930 is cached in network element 915, then the network element 915 will return the data packet 945 to the subscriber 905 via the network element 910. However, if the data packet 945 is not cached at network element 915, the network element 915 routes the interest packet 930 on (e.g., to network element 920). To facilitate routing, the network elements may use a forwarding information base 925 (FIB) to match named data to an interface (e.g., physical port) for the route. Thus, the FIB 925 operates much like a routing table on a traditional network device.

In an example, additional meta-data may be attached to the interest packet 930, the cached data, or the route (e.g., in the FIB 925), to provide an additional level of matching. For example, the data name may be specified as "www.somedomain.com or videos or v8675309," but also include a version number—or timestamp, time range, endorsement, etc. In this example, the interest packet 930 may specify the desired name, the version number, or the version range. The matching may then locate routes or cached data matching the name and perform the additional comparison of meta-data or the like to arrive at an ultimate decision as to whether data or a route matches the interest packet 930 for respectively responding to the interest packet 930 with the data packet 945 or forwarding the interest packet 930.

ICN has advantages over host-based networking because the data segments are individually named. This enables aggressive caching throughout the network as a network element may provide a data packet 945 in response to an interest packet 930 as easily as an original author 940. Accordingly, it is less likely that the same segment of the network will transmit duplicates of the same data requested by different devices.

Fine grained encryption is another feature of many ICN networks. A typical data packet 945 includes a name for the data that matches the name in the interest packet 930. Further, the data packet 945 includes the requested data and may include additional information to filter similarly named data (e.g., by creation time, expiration time, version, etc.). To address malicious entities providing false information under the same name, the data packet 945 may also encrypt its contents with a publisher key or provide a cryptographic hash of the data and the name. Thus, knowing the key (e.g., from a certificate of an expected publisher 940) enables the recipient to ascertain whether the data is from that publisher 940. This technique also facilitates the aggressive caching of the data packets 945 throughout the network because each data packet 945 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 10:
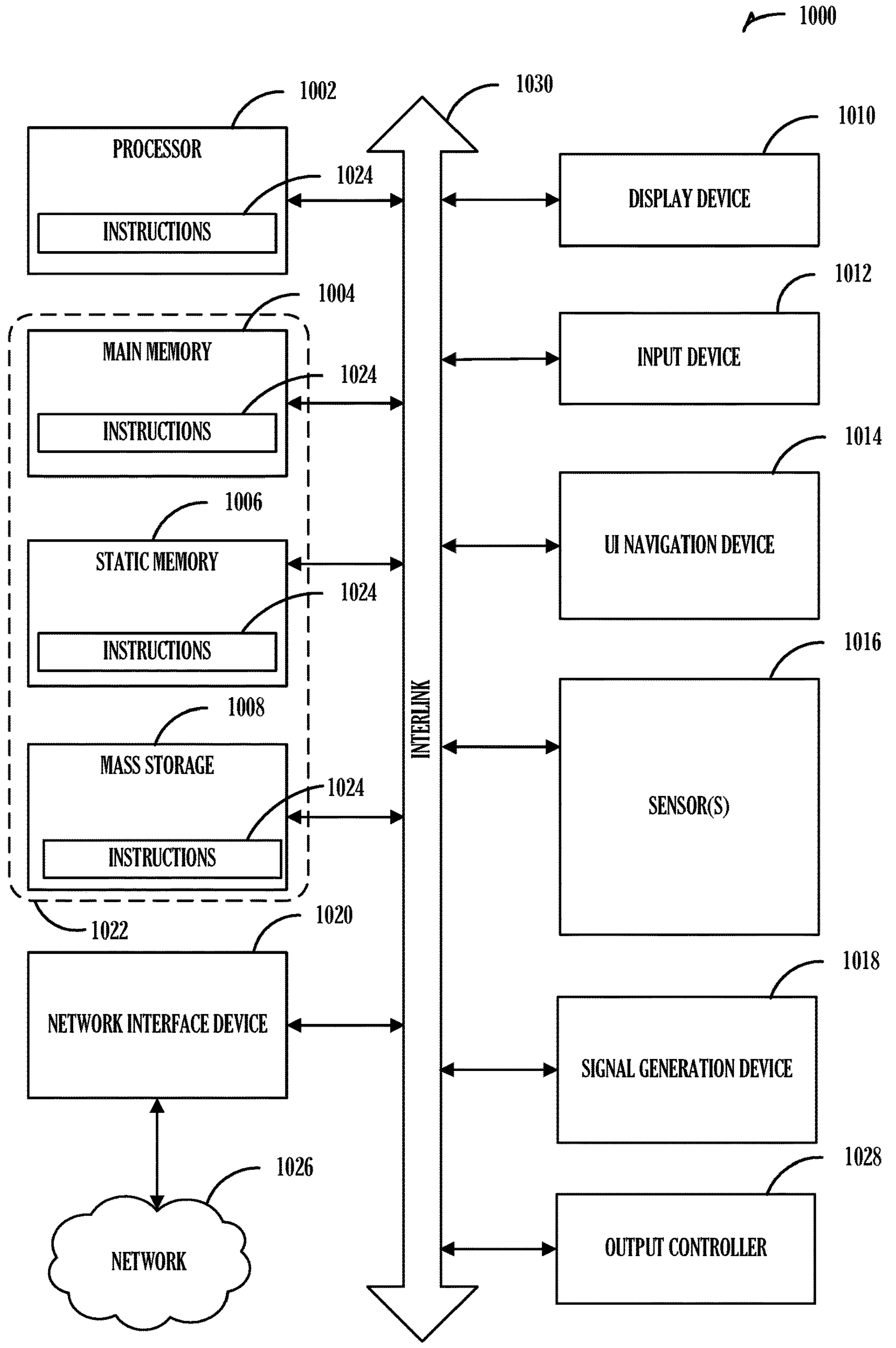
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 may be representative of the instructions 1024, such as instructions 1024 themselves or a format from which the instructions 1024 may be derived. This format from which the instructions 1024 may be derived may include source code, encoded instructions (e.g., in compressed or encrypted form), packaged instructions (e.g., split into multiple packages), or the like. The information representative of the instructions 1024 in the machine readable medium 1022 may be processed by processing circuitry into the instructions to implement any of the operations discussed herein. For example, deriving the instructions 1024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 may include assembly, compilation, or interpretation of the information (e.g., by the processing circuitry) to create the instructions 1024 from some intermediate or preprocessed format provided by the machine readable medium 1022. The information, when provided in multiple parts, may be combined, unpacked, and modified to create the instructions 1024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

Additional Notes & Examples

Example 1 is a device for interest packet orchestration in information centric networking (ICN), the device comprising: multiple interfaces, each interface configured to link to a node over a network; memory including instructions; and processing circuitry that, when in operation, is configured by the instructions to: receive an interest packet, the interest packet including: a compound name, the compound name including multiple ICN name components; and a field including a list of ICN components; locate an ICN name component from the multiple ICN name components that is represented in the list of ICN components; select an interface from the multiple interfaces, based on the ICN name component; and transmit the interest packet via the interface.

In Example 2, the subject matter of Example 1, wherein each of the ICN name components use a second level delimiter that is different than a first level delimiter of an ICN network to which the device is configured to operate within.

In Example 3, the subject matter of Example 2, wherein the device uses a naming convention that is hierarchical and uses the first level delimiter to create a first name format, and wherein the ICN name component uses the second level delimiter to create a second name format, the second name format conforming to the first name format except for the second level delimiter.

In Example 4, the subject matter of Example 3, wherein the first level delimiter is a slash '/' and the second level delimiter is a hyphen '-', a pipe '|', an asterisk '*', or an underscore '_'.

In Example 5, the subject matter of any of Examples 3-4, wherein the multiple ICN name components include a re-coded compound name, the re-coded compound name replacing the first level delimiter with a third level delimiter, the third level delimiter being different than both the first level delimiter and the second level delimiter.

In Example 6, the subject matter of any of Examples 1-5, wherein the processing circuitry is configured by the instructions to: locate a second ICN name component from the multiple ICN name components, the second ICN name component matching a resource of the device; and remove an item, from the list of ICN components, that corresponds to the second ICN name component prior to communicating the interest packet to the interface.

In Example 7, the subject matter of Example 6, wherein the resource is a cache entry of data or a computation result.

In Example 8, the subject matter of any of Examples 6-7, wherein the resource is a computational resource corresponding to hardware of the device, the computational resource having a resource type of COMPUTE.

In Example 9, the subject matter of any of Examples 6-8, wherein the resource is a software resource corresponding to instructions stored in the device, the software resource having a resource type of SOFTWARE.

In Example 10, the subject matter of any of Examples 6-9, wherein the resource is a data resource corresponding to data stored in the device, the data resource having a resource type of DATA.

In Example 11, the subject matter of any of Examples 1-10, wherein each of the multiple ICN name components corresponds to a resource type that is identified in the ICN name component.

In Example 12, the subject matter of Example 11, wherein the resource type is DATA, SOFTWARE, or COMPUTE.

In Example 13, the subject matter of Example 12, wherein the compound name includes, from the multiple ICN name components, a first ICN name component that is COMPUTE, a second ICN name component that is SOFTWARE, and a third ICN name component that is DATA.

In Example 14, the subject matter of any of Examples 1-13, wherein the processing circuitry is configured by the instructions to: locate a second ICN name component from the multiple ICN name components that is not represented in the list of ICN components; and update a forwarding information base (FIB) of the device with an entry directing a second interest packet for the second ICN name component through a second interface upon which the interest packet was received.

Example 15 is a method for interest packet orchestration in information centric networking (ICN), the method comprising: receiving, at processing circuitry of an ICN router, an interest packet, the interest packet including: a compound name, the compound name including multiple ICN name components; and a field including a list of ICN components; locating an ICN name component from the multiple ICN name components that is represented in the list of ICN components; selecting an interface from multiple interfaces, based on the ICN name component; and transmitting the interest packet via the interface.

In Example 16, the subject matter of Example 15, wherein each of the ICN name components use a second level delimiter that is different than a first level delimiter of an ICN network to which the ICN router is configured to operate within.

In Example 17, the subject matter of Example 16, wherein the ICN router uses a naming convention that is hierarchical and uses the first level delimiter to create a first name format, and wherein the ICN name component uses the second level delimiter to create a second name format, the second name format conforming to the first name format except for the second level delimiter.

In Example 18, the subject matter of Example 17, wherein the first level delimiter is a slash '/' and the second level delimiter is a hyphen '-', a pipe '|', an asterisk '*', or an underscore '_'.

In Example 19, the subject matter of any of Examples 17-18, wherein the multiple ICN name components include a re-coded compound name, the re-coded compound name replacing the first level delimiter with a third level delimiter, the third level delimiter being different than both the first level delimiter and the second level delimiter.

In Example 20, the subject matter of any of Examples 15-19, comprising: locating a second ICN name component from the multiple ICN name components, the second ICN name component matching a resource of the ICN router; and removing an item, from the list of ICN components, that corresponds to the second ICN name component prior to communicating the interest packet to the interface.

In Example 21, the subject matter of Example 20, wherein the resource is a cache entry of data or a computation result.

In Example 22, the subject matter of any of Examples 20-21, wherein the resource is a computational resource corresponding to hardware of the ICN router, the computational resource having a resource type of COMPUTE.

In Example 23, the subject matter of any of Examples 20-22, wherein the resource is a software resource corresponding to instructions stored in the ICN router, the software resource having a resource type of SOFTWARE.

In Example 24, the subject matter of any of Examples 20-23, wherein the resource is a data resource corresponding to data stored in the ICN router, the data resource having a resource type of DATA.

In Example 25, the subject matter of any of Examples 15-24, wherein each of the multiple ICN name components corresponds to a resource type that is identified in the ICN name component.

In Example 26, the subject matter of Example 25, wherein the resource type is DATA, SOFTWARE, or COMPUTE.

In Example 27, the subject matter of Example 26, wherein the compound name includes, from the multiple ICN name components, a first ICN name component that is COMPUTE, a second ICN name component that is SOFTWARE, and a third ICN name component that is DATA.

In Example 28, the subject matter of any of Examples 15-27, comprising: locating a second ICN name component from the multiple ICN name components that is not represented in the list of ICN components; and updating a forwarding information base (FIB) of the ICN router with an entry directing a second interest packet for the second ICN name component through a second interface upon which the interest packet was received.

Example 29 is at least one machine readable medium including instructions for interest packet orchestration in information centric networking (ICN), the instructions, when executed by processing circuitry of a device, cause the device to perform operations comprising: receiving an interest packet, the interest packet including: a compound name, the compound name including multiple ICN name components; and a field including a list of ICN components; locating an ICN name component from the multiple ICN name components that is represented in the list of ICN components; selecting an interface from multiple interfaces, based on the ICN name component; and transmitting the interest packet via the interface.

In Example 30, the subject matter of Example 29, wherein each of the ICN name components use a second level delimiter that is different than a first level delimiter of an ICN network to which the device is configured to operate within.

In Example 31, the subject matter of Example 30, wherein the device uses a naming convention that is hierarchical and uses the first level delimiter to create a first name format, and wherein the ICN name component uses the second level delimiter to create a second name format, the second name format conforming to the first name format except for the second level delimiter.

In Example 32, the subject matter of Example 31, wherein the first level delimiter is a slash '/' and the second level delimiter is a hyphen '-', a pipe '|', an asterisk '*', or an underscore '_'.

In Example 33, the subject matter of any of Examples 31-32, wherein the multiple ICN name components include a re-coded compound name, the re-coded compound name replacing the first level delimiter with a third level delimiter, the third level delimiter being different than both the first level delimiter and the second level delimiter.

In Example 34, the subject matter of any of Examples 29-33, wherein the operations comprise: locating a second ICN name component from the multiple ICN name components, the second ICN name component matching a resource of the device; and removing an item, from the list of ICN components, that corresponds to the second ICN name component prior to communicating the interest packet to the interface.

In Example 35, the subject matter of Example 34, wherein the resource is a cache entry of data or a computation result.

In Example 36, the subject matter of any of Examples 34-35, wherein the resource is a computational resource corresponding to hardware of the device, the computational resource having a resource type of COMPUTE.

In Example 37, the subject matter of any of Examples 34-36, wherein the resource is a software resource corresponding to instructions stored in the device, the software resource having a resource type of SOFTWARE.

In Example 38, the subject matter of any of Examples 34-37, wherein the resource is a data resource corresponding to data stored in the device, the data resource having a resource type of DATA.

In Example 39, the subject matter of any of Examples 29-38, wherein each of the multiple ICN name components corresponds to a resource type that is identified in the ICN name component.

In Example 40, the subject matter of Example 39, wherein the resource type is DATA, SOFTWARE, or COMPUTE.

In Example 41, the subject matter of Example 40, wherein the compound name includes, from the multiple ICN name components, a first ICN name component that is COMPUTE, a second ICN name component that is SOFTWARE, and a third ICN name component that is DATA.

In Example 42, the subject matter of any of Examples 29-41, wherein the operations comprise: locating a second ICN name component from the multiple ICN name components that is not represented in the list of ICN components;

and updating a forwarding information base (FIB) of the device with an entry directing a second interest packet for the second ICN name component through a second interface upon which the interest packet was received.

Example 43 is a system for interest packet orchestration in information centric networking (ICN), the system comprising: means for receiving an interest packet, the interest packet including: a compound name, the compound name including multiple ICN name components; and a field including a list of ICN components; means for locating an ICN name component from the multiple ICN name components that is represented in the list of ICN components; means for selecting an interface from multiple interfaces, based on the ICN name component; and means for transmitting the interest packet via the interface.

In Example 44, the subject matter of Example 43, wherein each of the ICN name components use a second level delimiter that is different than a first level delimiter of an ICN network to which the system is configured to operate within.

In Example 45, the subject matter of Example 44, wherein the system uses a naming convention that is hierarchical and uses the first level delimiter to create a first name format, and wherein the ICN name component uses the second level delimiter to create a second name format, the second name format conforming to the first name format except for the second level delimiter.

In Example 46, the subject matter of Example 45, wherein the first level delimiter is a slash '/' and the second level delimiter is a hyphen '-', a pipe '|', an asterisk '*', or an underscore '_'.

In Example 47, the subject matter of any of Examples 45-46, wherein the multiple ICN name components include a re-coded compound name, the re-coded compound name replacing the first level delimiter with a third level delimiter, the third level delimiter being different than both the first level delimiter and the second level delimiter.

In Example 48, the subject matter of any of Examples 43-47, comprising: means for locating a second ICN name component from the multiple ICN name components, the second ICN name component matching a resource of the system; and means for removing an item, from the list of ICN components, that corresponds to the second ICN name component prior to communicating the interest packet to the interface.

In Example 49, the subject matter of Example 48, wherein the resource is a cache entry of data or a computation result.

In Example 50, the subject matter of any of Examples 48-49, wherein the resource is a computational resource corresponding to hardware of the system, the computational resource having a resource type of COMPUTE.

In Example 51, the subject matter of any of Examples 48-50, wherein the resource is a software resource corresponding to instructions stored in the system, the software resource having a resource type of SOFTWARE.

In Example 52, the subject matter of any of Examples 48-51, wherein the resource is a data resource corresponding to data stored in the system, the data resource having a resource type of DATA.

In Example 53, the subject matter of any of Examples 43-52, wherein each of the multiple ICN name components corresponds to a resource type that is identified in the ICN name component.

In Example 54, the subject matter of Example 53, wherein the resource type is DATA, SOFTWARE, or COMPUTE.

In Example 55, the subject matter of Example 54, wherein the compound name includes, from the multiple ICN name components, a first ICN name component that is COMPUTE, a second ICN name component that is SOFTWARE, and a third ICN name component that is DATA.

In Example 56, the subject matter of any of Examples 43-55, comprising: means for locating a second ICN name component from the multiple ICN name components that is not represented in the list of ICN components; and means for updating a forwarding information base (FIB) of the system with an entry directing a second interest packet for the second ICN name component through a second interface upon which the interest packet was received.

PNUM Example 57 is at least one machine-readable medium including instructions that, when executed by processing circuitry, cause the processing circuitry to perform operations to implement of any of Examples 1-56.

PNUM Example 58 is an apparatus comprising means to implement of any of Examples 1-56.

PNUM Example 59 is a system to implement of any of Examples 1-56.

PNUM Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for interest packet orchestration in information centric networking (ICN), the device comprising:

multiple interfaces, each interface configured to link to a node over a network;

memory including instructions; and processing circuitry that, when in operation, is configured by the instructions to:

receive an interest packet, the interest packet including:

a compound name, the compound name including multiple ICN name components, wherein each of the multiple ICN name components use a second level delimiter that is different than a first level delimiter of an ICN network to which the device is configured to operate within; and a field including a list of ICN components;

locate an ICN name component from the multiple ICN name components that is represented in the list of ICN components, wherein the device uses a naming convention that is hierarchical and uses the first level delimiter to create a first name format, wherein the ICN name component uses the second level delimiter to create a second name format, the second name format conforming to the first name format except for the second level delimiter, and wherein the multiple ICN name components include a re-coded compound name, the re-coded compound name replacing the first level delimiter with a third level delimiter, the third level delimiter being different than both the first level delimiter and the second level delimiter;

select an interface from the multiple interfaces, based on the ICN name component; and transmit the interest packet via the interface.

2. The device of claim 1, wherein the first level delimiter is a slash '/' and the second level delimiter is a hyphen '-', a pipe '|', an asterisk '*', or an underscore '_'.

3. The device of claim 1, wherein the processing circuitry is configured by the instructions to:

locate a second ICN name component from the multiple ICN name components, the second ICN name component matching a resource of the device; and remove an item, from the list of ICN components, that corresponds to the second ICN name component prior to communicating the interest packet to the interface.

4. The device of claim 1, wherein each of the multiple ICN name components corresponds to a resource type that is identified in the ICN name component.

5. The device of claim 4, wherein the resource type is DATA, SOFTWARE, or COMPUTE.

6. The device of claim 5, wherein the compound name includes, from the multiple ICN name components, a first ICN name component that is COMPUTE, a second ICN name component that is SOFTWARE, and a third ICN name component that is DATA.

7. The device of claim 1, wherein the processing circuitry is configured by the instructions to:

locate a second ICN name component from the multiple ICN name components that is not represented in the list of ICN components; and update a forwarding information base (FIB) of the device with an entry directing a second interest packet for the second ICN name component through a second interface upon which the interest packet was received.

8. At least one non-transitory machine readable medium including instructions for interest packet orchestration in information centric networking (ICN), the instructions, when executed by processing circuitry of a device, cause the device to perform operations comprising:

receiving an interest packet, the interest packet including:

a compound name, the compound name including multiple ICN name components, wherein each of the multiple ICN name components corresponds to a resource type that is identified in the ICN name component, wherein the resource type is DATA, SOFTWARE, or COMPUTE, and wherein the compound name includes, from the multiple ICN name components, a first ICN name component that is COMPUTE, a second ICN name component that is SOFTWARE, and a third ICN name component that is DATA; and a field including a list of ICN components;

locating an ICN name component from the multiple ICN name components that is represented in the list of ICN components;

selecting an interface from multiple interfaces, based on the ICN name component; and transmitting the interest packet via the interface.

9. The at least one non-transitory machine readable medium of claim 8, wherein each of the ICN name components use a second level delimiter that is different than a first level delimiter of an ICN network to which the device is configured to operate within.

10. The at least one non-transitory machine readable medium of claim 9, wherein the device uses a naming convention that is hierarchical and uses the first level delimiter to create a first name format, and wherein the ICN name component uses the second level delimiter to create a second name format, the second name format conforming to the first name format except for the second level delimiter.

11. The at least one non-transitory machine readable medium of claim 10, wherein the first level delimiter is a slash '/' and the second level delimiter is a hyphen '-', a pipe '|', an asterisk '*', or an underscore '_'.

12. The at least one non-transitory machine readable medium of claim 10, wherein the multiple ICN name components include a re-coded compound name, the re-coded compound name replacing the first level delimiter with a third level delimiter, the third level delimiter being different than both the first level delimiter and the second level delimiter.

13. The at least one non-transitory machine readable medium of claim 8, wherein the operations comprise:

locating a second ICN name component from the multiple ICN name components, the second ICN name component matching a resource of the device; and removing an item, from the list of ICN components, that corresponds to the second ICN name component prior to communicating the interest packet to the interface.

14. The at least one non-transitory machine readable medium of claim 8, wherein the operations comprise:

locating a second ICN name component from the multiple ICN name components that is not represented in the list of ICN components; and updating a forwarding information base (FIB) of the device with an entry directing a second interest packet for the second ICN name component through a second interface upon which the interest packet was received.

15. The device of claim 3, wherein the resource is a computational resource corresponding to hardware of the device, the computational resource having a resource type of COMPUTE.

16. The device of claim 3, wherein the resource is a software resource corresponding to instructions stored in the device, the software resource having a resource type of SOFTWARE.

17. The device of claim 3, wherein the resource is a data resource corresponding to data stored in the device, the data resource having a resource type of DATA.

18. The at least one non-transitory machine readable medium of claim 13, wherein the resource is a cache entry of data or a computation result.

19. The at least one non-transitory machine readable medium of claim 13, wherein the resource is a computational resource corresponding to hardware of the device, the computational resource having a resource type of COMPUTE.

20. The at least one non-transitory machine readable medium of claim 13, wherein the resource is a software resource corresponding to instructions stored in the device, the software resource having a resource type of SOFTWARE.

* * * * *